(12) United States Patent
Kakigi

(10) Patent No.: US 12,458,192 B2
(45) Date of Patent: Nov. 4, 2025

(54) BOARDING SWEEPER WITH GUIDES PASSING AIR THROUGH A BATTERY HOLDER

(71) Applicant: HONDA MOTOR CO., LTD., Tokyo (JP)

(72) Inventor: Sho Kakigi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 384 days.

(21) Appl. No.: 17/952,566

(22) Filed: Sep. 26, 2022

(65) Prior Publication Data

US 2024/0099532 A1 Mar. 28, 2024

(51) Int. Cl.
| | |
|---|---|
| *A47L 9/28* | (2006.01) |
| *A47L 5/22* | (2006.01) |
| *A47L 9/00* | (2006.01) |
| *A47L 9/04* | (2006.01) |
| *A47L 9/12* | (2006.01) |
| *E01H 1/00* | (2006.01) |
| *E01H 1/08* | (2006.01) |
| *H01M 10/613* | (2014.01) |
| *H01M 10/625* | (2014.01) |
| *H01M 10/6563* | (2014.01) |
| *H01M 50/249* | (2021.01) |

(52) U.S. Cl.
CPC ............... *A47L 9/2884* (2013.01); *A47L 5/22* (2013.01); *A47L 9/009* (2013.01); *A47L 9/0472* (2013.01); *A47L 9/122* (2013.01); *A47L 9/2889* (2013.01); *E01H 1/005* (2013.01); *E01H 1/0854* (2013.01); *H01M 10/613* (2015.04); *H01M 10/625* (2015.04); *H01M 10/6563* (2015.04); *H01M 50/249* (2021.01); *H01M 2220/20* (2013.01)

(58) Field of Classification Search
CPC ....... E01H 1/00; E01H 1/0845; E01H 1/0854; A47L 9/2884; A47L 9/2889; A47L 5/22; H01M 10/6563
See application file for complete search history.

(56) References Cited

U.S. PATENT DOCUMENTS

| | | | | |
|---|---|---|---|---|
| 2,739,340 | A * | 3/1956 | Blydenburgh | E01H 1/0854 15/384 |
| 3,165,775 | A * | 1/1965 | Lutz | A47L 9/2889 60/489 |
| 3,173,777 | A * | 3/1965 | Tamny | A47L 11/4027 55/467 |
| 4,555,825 | A * | 12/1985 | Van Raaij | E01H 1/0827 15/340.3 |
| 2004/0237247 | A1* | 12/2004 | Nowak | A47L 11/4027 15/340.1 |

FOREIGN PATENT DOCUMENTS

| | | | | |
|---|---|---|---|---|
| DE | 10342454 A1 * | 4/2005 | | A47L 11/24 |
| DE | 102007037010 A1 * | 2/2008 | | E01H 1/0854 |
| JP | H05-300856 A | 11/1993 | | |

* cited by examiner

Primary Examiner — Carlos A. Rivera
(74) Attorney, Agent, or Firm — Thomas Horstemeyer, LLP (57) ABSTRACT

A boarding sweeper comprises a cleaning working unit capable of executing cleaning work, a seat portion for seating a user, an operation input unit that allows the user to input a driving operation, a suction unit provided in a vicinity of the cleaning working unit, a battery holder that detachably holds a battery unit, and an air guiding mechanism that guides suction air from the suction unit so that the suction air passes through the battery holder.

12 Claims, 7 Drawing Sheets

FIG. 1

BOARDING SWEEPER WITH GUIDES PASSING AIR THROUGH A BATTERY HOLDER

BACKGROUND OF THE INVENTION

Field of the Invention

The present invention relates to a boarding sweeper.

Description of the Related Art

Some sweepers are configured to allow a user to board a sweeper main body, and allow the user to execute cleaning work on a road surface or a floor surface while driving and operating the sweeper (see Japanese Patent Laid-Open No. 5-300856). Such a sweeper may also be referred to as a road surface cleaning machine, a floor cleaning machine, or simply a cleaning machine, and may also be referred to as a working machine from other viewpoints.

Some of the sweepers described above include a detachable battery unit to allow the battery unit to be replaced at a desired timing, thereby allowing for a relatively wide cleaning area. In general, in such a sweeper, further contrivance for improving the efficiency of the cleaning work is required.

SUMMARY OF THE INVENTION

An exemplary object of the present invention is to improve the efficiency of cleaning work by a sweeper.

One of the aspects of the present invention provides a boarding sweeper, comprising a cleaning working unit capable of executing cleaning work, a seat portion for seating a user, an operation input unit that allows the user to input a driving operation, a suction unit provided in a vicinity of the cleaning working unit, a battery holder that detachably holds a battery unit, and an air guiding mechanism that guides suction air from the suction unit so that the suction air passes through the battery holder.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Figure 1:
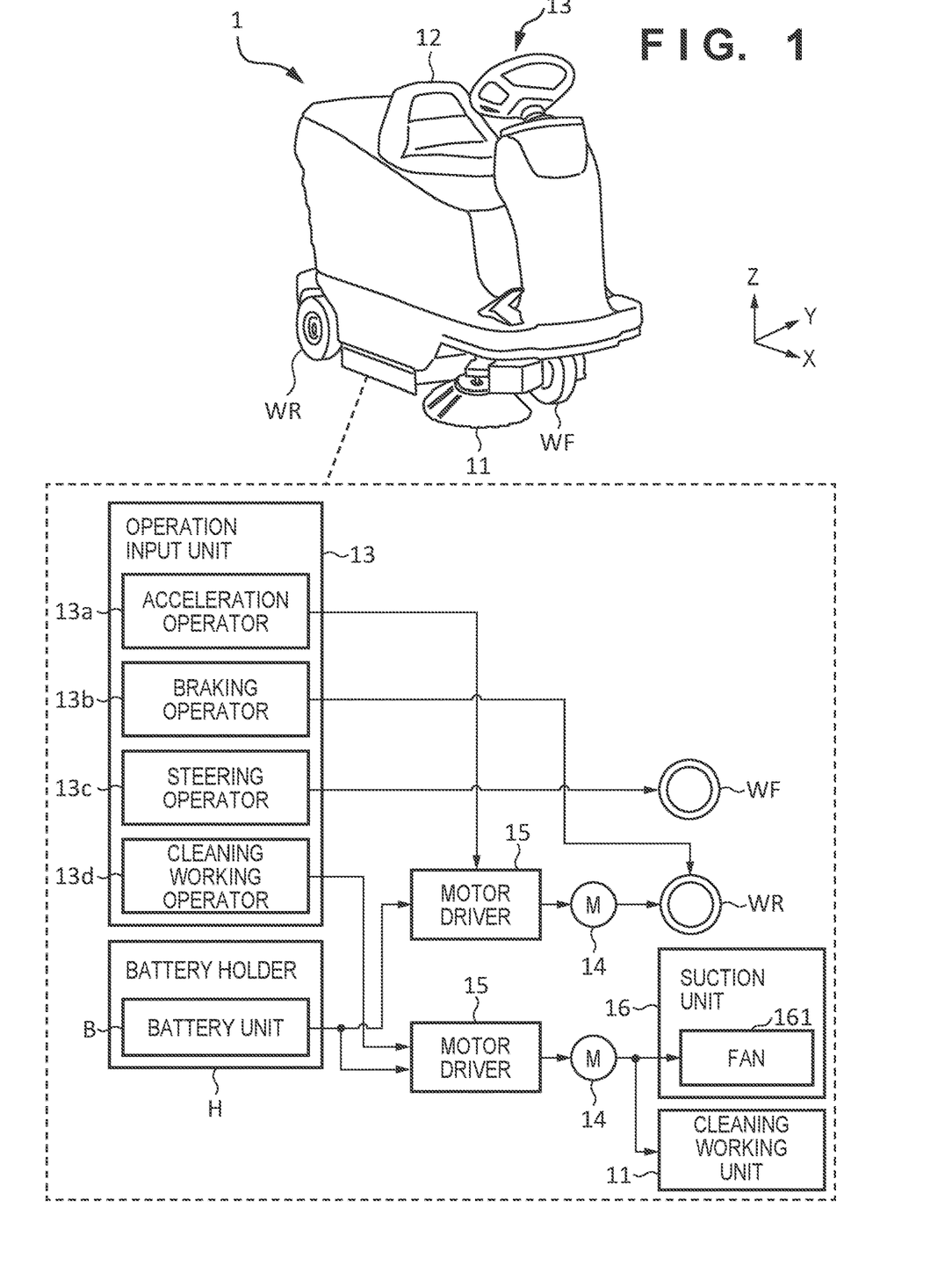
FIG. 1 is a perspective view of a structure of a sweeper according to an embodiment.

FIG. 1 is a perspective view of a structure of a sweeper 1 according to a first embodiment. In the drawing, an X axis, a Y axis, and a Z axis orthogonal to each other are illustrated in order to facilitate understanding of the structure (the same applies to other drawings described later). The X direction corresponds to a front-and-rear direction of the vehicle body, the Y direction corresponds to a left-right direction of the vehicle body or a vehicle width direction, and the Z direction corresponds to a vertical direction of the vehicle body. In the present specification, terms such as front/rear, left/right (lateral), and up/down refer to relative positional relationships with respect to the vehicle body. For example, terms such as "front" and "front side" correspond to the +X direction, and terms such as "rear" and "rear side" correspond to the −X direction. Similarly, expressions such as the inside of the vehicle body, the outside of the vehicle body (inside and outside of the vehicle), and the like indicate a relative positional relationship with respect to the vehicle body.

The sweeper 1 includes a cleaning working unit 11, a seat portion 12, and an operation input unit 13. The cleaning working unit 11 is configured to perform cleaning work. In the present embodiment, the cleaning working unit 11 is a rotary brush attached to a lower portion of a vehicle body and having substantially a Z axis as a rotation axis, and the cleaning work on the road surface or the floor surface can be realized by the rotation of the rotary brush. Further, the rotary brush may be configured to be movable up and down, and can realize or curtail the cleaning work by approaching or separating from the road surface. Incidentally, the rotary brush main body may be configured to be swingable with respect to the rotation axis, or the rotation axis of the rotary brush may be swingable with respect to the Z direction.

The seat portion 12 is configured such that a user can sit on the seat portion 12, whereby the user can access the operation input unit 13 in a state of being seated on the seat portion 12. Although details will be described later, the operation input unit 13 can input driving operations such as straight traveling, backward traveling, and turning of the sweeper 1, and can also perform operation input for the cleaning working unit 11.

Figure 2A:
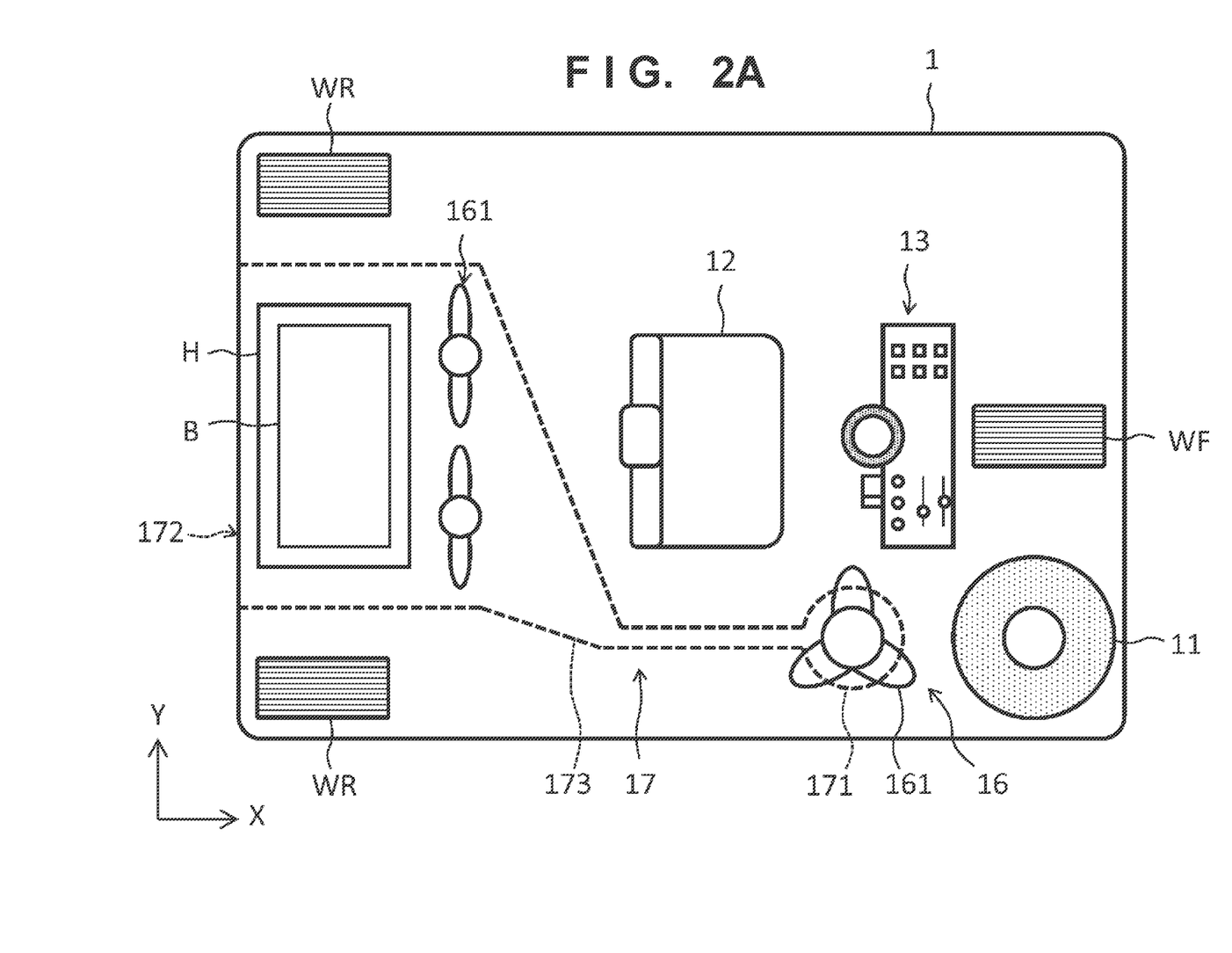
FIG. 2A is a schematic top view illustrating an example of a configuration of a sweeper.
Figure 2B:
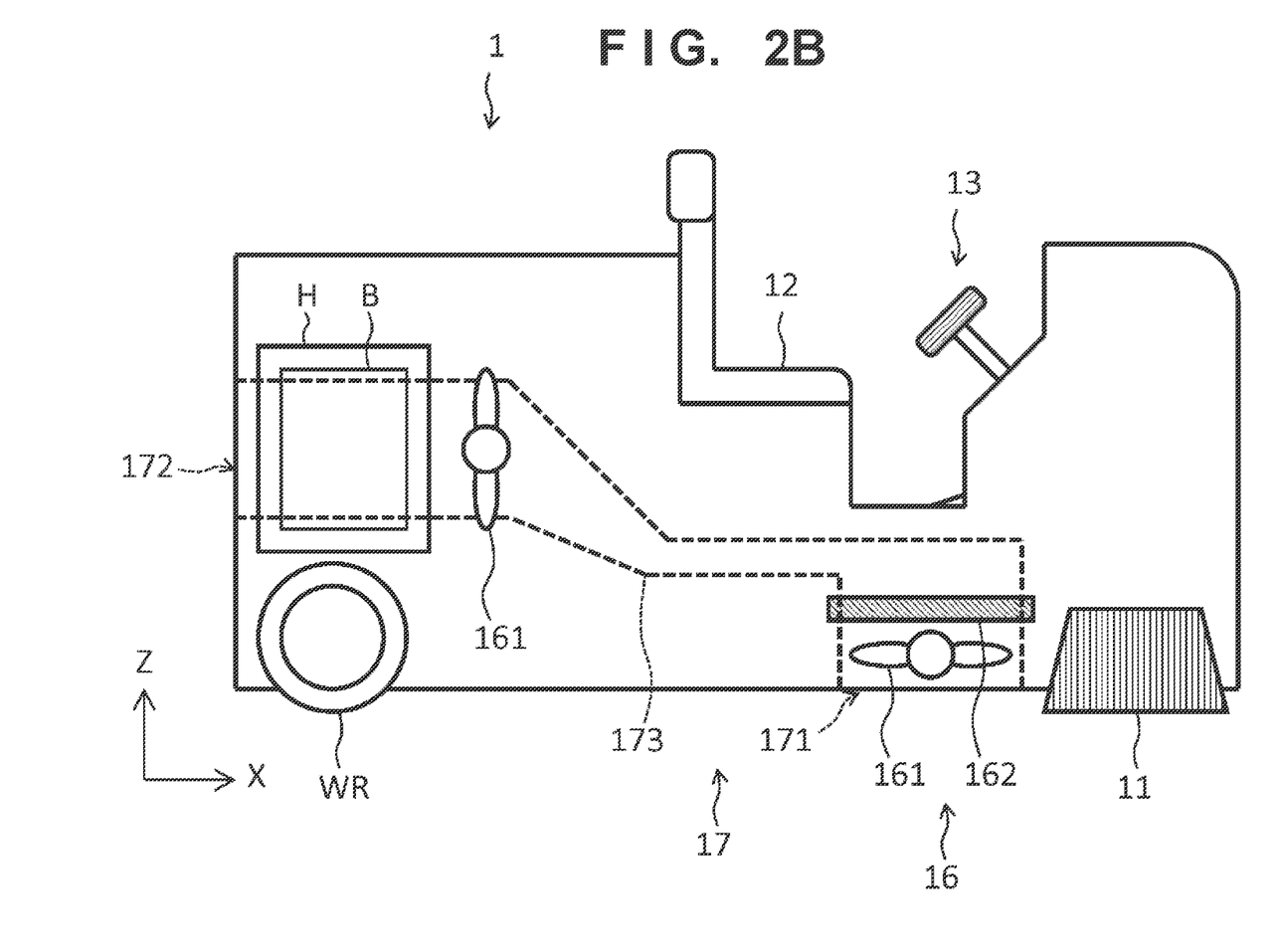
FIG. 2B is a schematic side view illustrating an example of a configuration of a sweeper.

FIGS. 2A and 2B schematically illustrate an example of the configuration of the sweeper 1. FIG. 2A illustrates a configuration example of the sweeper 1 in a plan view, and FIG. 2B illustrates a configuration example of the sweeper 1 in a side view. Hereinafter, a configuration example of the sweeper 1 will be described with reference to FIGS. 1, 2A, and 2B.

In the present embodiment, the sweeper 1 is a three-wheeled vehicle further including a pair of left and right rear wheels WR which are drive wheels and a single front wheel WF which is a steering wheel, and further includes a battery holder H, an electric motor 14, and a motor driver 15. The battery holder H holds the battery unit B in a detachable or insertable/removable manner.

The electric motor 14 is driven and controlled by the motor driver 15 based on the electric power of the battery unit B held by the battery holder H, and generates power (rotation). The power is used to drive other mechanical elements included in the sweeper 1 in addition to the drive of the rear wheel WR, and a plurality of electric motors 14 and a plurality of motor drivers 15 can be provided correspondingly.

The operation input unit 13 includes an acceleration operator 13*a*, a braking operator 13*b*, and a steering operator 13*c*. The user can drive the rear wheel WR using the acceleration operator 13*a* and the braking operator 13*b*, and can change the direction of the front wheel WF using the steering operator 13*c*. In this manner, the user can perform driving operations such as straight traveling, backward traveling, and turning of the sweeper 1. A known operator may be used as each operator. For example, an accelerator pedal or the like may be used for the acceleration operator 13*a*, a brake pedal or the like may be used for the braking operator 13*b*, and a steering wheel or the like may be used for the steering operator 13*c*.

In the present embodiment, the steering operator 13*c* may be a steering mechanism having the front wheel WF as a steering wheel, and may be configured to be able to change the direction of the front wheel WF via a shaft based on the rotation of the steering wheel. Therefore, the steering operator 13*c* can have a relatively simple configuration.

The operation input unit 13 further includes a cleaning working operator 13*d*, and the user can bring the cleaning working unit 11 into the operating state or the dormant state using the cleaning working operator 13*d*, and change the operation level in the operating state. As the cleaning working operator 13*d*, a known switch such as a lever type switch or a button type switch may be used.

As illustrated in FIGS. 2A and 2B, the sweeper 1 further includes a suction unit 16 and an air guiding mechanism 17. The suction unit 16 is configured to be capable of executing negative pressure suction, and is provided in the vicinity of the cleaning working unit 11, in the present embodiment, behind the cleaning working unit 11. As a result, foreign matter (dirt, dust, trash, chemicals for cleaning them, and the like) generated by the rotation of the rotary brush serving as the cleaning working unit 11 can be sucked by the suction unit 16.

In the present embodiment, the suction unit 16 executes negative pressure suction in conjunction with the operating state of the cleaning working unit 11, but may be driven independently of the state of the cleaning working unit 11 as another embodiment. The suction unit 16 includes a fan 161 and a filter portion 162, the fan 161 performs negative pressure suction using the power of the electric motor 14, and the air (hereinafter, suction air) generated thereby is taken into the sweeper 1 via the filter portion 162. The filter portion 162 filters particles in the suction air, thereby holding foreign matter generated by the cleaning work and sucked in the sweeper 1.

The air guiding mechanism 17 is a guide member that guides the suction air taken into the sweeper 1, and can be fixed to the chassis or the main frame of the sweeper 1. The air guiding mechanism 17 includes a suction port 171, an exhaust port 172, and an air guide passage 173. The suction port 171 is an opening for taking suction air by the suction unit 16 into the sweeper 1. The exhaust port 172 is an opening for discharging the suction air to the outside of the sweeper 1. In the present embodiment, the suction port 171 is provided below the vehicle body together with the suction unit 16, and the exhaust port 172 is provided behind the vehicle body together with the battery holder H. The air guide passage 173 connects between the suction port 171 and the exhaust port 172, and forms a flow path of suction air so that the suction air passes through the battery holder H and the battery unit B held therein, which will be described in detail later.

In the present embodiment, the battery holder H is disposed on the lower rear side of the seat portion 12, so that the user can attach or detach the battery unit B on the rear side of the vehicle body of the sweeper 1. In addition, the user can attach or detach the battery unit B to or from the battery holder H at a desired timing, and can replace the battery unit B with a new battery unit B when the remaining amount of the battery unit B becomes equal to or less than a reference.

In the present embodiment, the direction of attachment or detachment of the battery unit B with respect to the battery holder H is set to the front-and-rear direction, and insertion and removal or attachment and detachment of the battery unit B is made slidable, so that the attachment or detachment is facilitated. The battery unit B is sealed by the door portion at the vehicle body rear portion of the sweeper 1, and the door portion can be opened and closed when the battery unit B is attached or detached. In this case, the exhaust port 172 can be provided in the door portion.

Here, for easy understanding, the battery holder H holds a single battery unit B, but may be capable of holding a plurality of battery units B.

With such a configuration, the user can get on the sweeper 1, cause the sweeper 1 to travel while performing operation input to the operation input unit 13, and perform cleaning work. Such a boarding sweeper 1 may be referred to as a road surface cleaning machine, a floor cleaning machine, or simply a cleaning machine, or may be referred to as a working machine from other viewpoints.

Incidentally, the battery unit B generally generates heat as chemical energy is converted into electric energy and electric power is output, and electrical characteristics deteriorate when the temperature becomes high. Therefore, a technique for cooling the battery unit B when using the sweeper 1 is required.

In the present embodiment, as illustrated in FIGS. 2A and 2B, the suction air introduced through the suction port 171 is guided by the air guide passage 173, passes through the battery holder H and the battery unit B held by the battery holder H, and is then discharged through the exhaust port 172. Therefore, the battery unit B that has generated heat and the battery holder H holding the battery unit B can be appropriately air-cooled by the suction air.

In the present embodiment, since the battery holder H detachably holds the battery unit B, the battery holder H is preferably configured such that heat of the battery unit B to be held is appropriately propagated to the battery holder H. For example, the battery holder H is preferably made of a material having a relatively high thermal conductivity and includes substantially the entire battery unit B. In this case, at least a part, preferably most, more preferably substantially all of the battery holder H may be located in the air guide passage 173.

Alternatively, a heat exchanger may be provided at a portion electrically or mechanically in contact with the battery unit B in the battery holder H and in the vicinity thereof, and one or more fins may be provided as a heat dissipation portion connected to the heat exchanger outside the battery holder H. In this case, the air guide passage 173 is preferably provided so that the suction air passes through the one or more fins.

According to such a configuration, the battery unit B can be cooled with a relatively simple configuration, and the cleaning work can be appropriately continued using the power of the battery unit B. Therefore, according to the present embodiment, it is advantageous for improving the efficiency of the cleaning work. In addition, since the battery unit B is replaceable, it is possible to continuously perform cleaning work on a relatively wide or various work areas by operating the sweeper 1 while replacing the battery unit B, which is also advantageous for improvement of usability.

In order to facilitate attachment or detachment of the battery unit B with respect to the battery holder H, the direction of attachment or detachment of the battery unit B is the front-and-rear direction in the present embodiment, but may be the vertical direction or the left-right direction as another embodiment.

Second Embodiment

Figure 3:
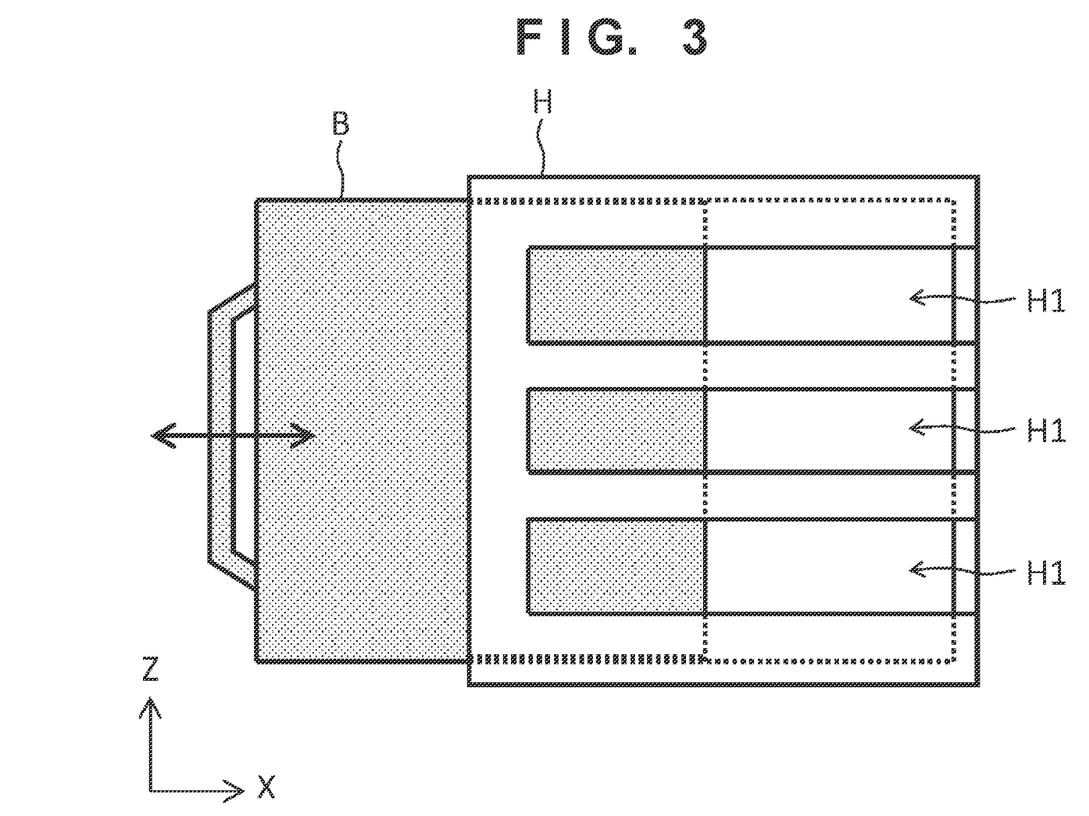
FIG. 3 is a schematic diagram illustrating another example of a battery holder and a battery unit.

FIG. 3 is a schematic diagram of the battery holder H and the battery unit B held by the battery holder H in the sweeper 1 according to a second embodiment. The battery holder H is provided with a notch H1 so as to partially expose the battery unit B to be held. As a result, the suction air directly hits the exposed surface of the battery unit B exposed by the notch H1, and the cooling efficiency of the battery unit B can be improved.

The notch H1 may be provided in an elongated shape in substantially the same direction as the air guiding direction of the suction air, and a concept thereof may include a slit (elongated opening). This makes it possible to prevent the suction air from staying in the notch H1.

In addition, the notch H1 is preferably provided in an elongated shape in substantially the same direction as the insertion and removal direction (here, the X direction) of the battery unit B with respect to the battery holder H. Accordingly, when the battery unit B is attached to or detached from the battery holder H, sliding between the battery unit B and the battery holder H is not hindered.

Third Embodiment

Figure 4:
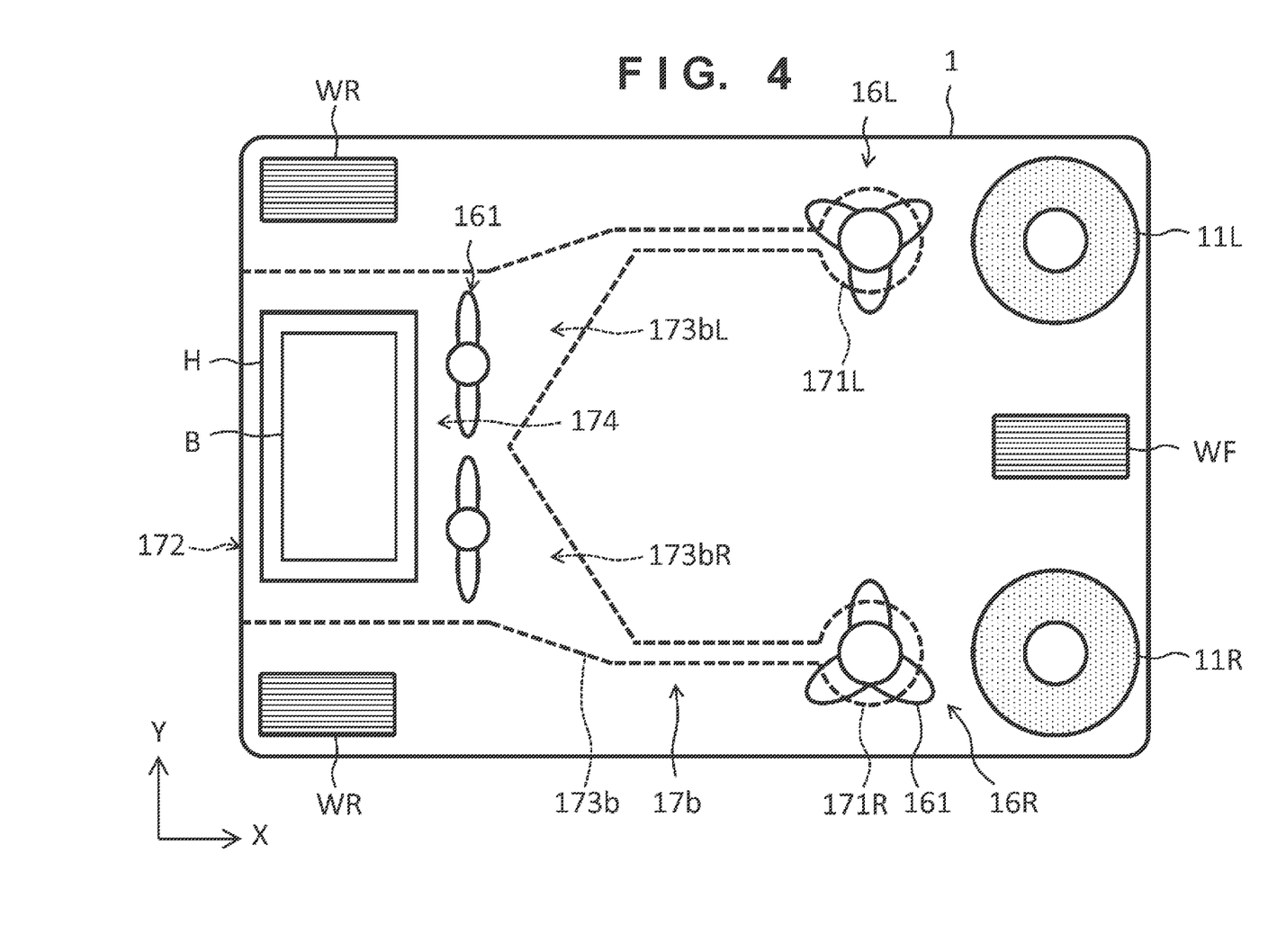
FIG. 4 is a schematic view illustrating another example of a configuration of an air guiding mechanism.

FIG. 4 illustrates a configuration example of the sweeper 1 and an air guiding mechanism 17b thereof according to a third embodiment (the seat portion 12 and the operation input unit 13 are not illustrated). The sweeper 1 may include a pair of left and right cleaning working units 11, which may be provided on both sides of the front wheel WF (for distinction, the cleaning working unit 11 on the left side is referred to as a cleaning working unit 11L, and the cleaning working unit 11 on the right side is referred to as a cleaning working unit 11R). In this case, the pair of left and right suction units 16L and 16R is provided corresponding to the cleaning working units 11L and 11R, and accordingly, the air guiding mechanism 17b may include the pair of left and right suction ports 171L and 171R, the exhaust port 172, and an air guide passage 173b.

In the present embodiment, the air guide passage 173b includes a flow path 173bL connecting the suction port 171L and the exhaust port 172 and a flow path 173bR connecting the suction port 171R and the exhaust port 172, and the flow paths 173bL and 173bR merge at a merging chamber 174 upstream of the exhaust port 172. In this case, at least a part, preferably most, more preferably substantially all of the battery holder H may be located in the merging chamber 174. As a result, the suction air is applied to the battery holder H from two directions, and the cooling efficiency of the battery unit B can be improved.

Figure 5:
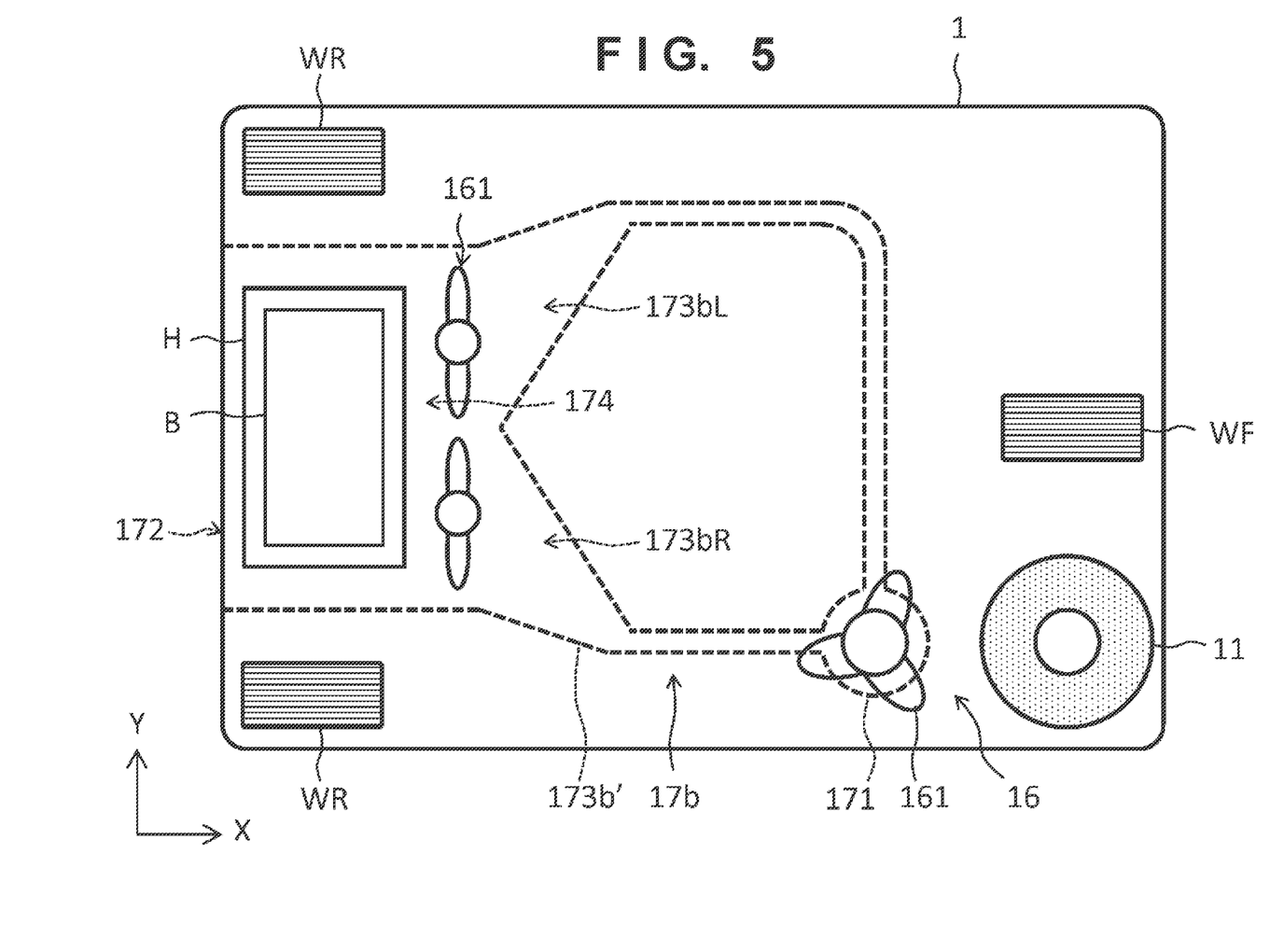
FIG. 5 is a schematic view illustrating another example of a configuration of an air guiding mechanism.

As illustrated in FIG. 5, even in the configuration including the single cleaning working unit 11 and the single suction unit 16, an air guide passage 173b' having the branch structure may be provided, so that a similar effect can be obtained.

In the present embodiment, the suction air can be applied to the battery holder H from each of the front left side and the front right side so that the suction air merging from the two directions is guided in one direction (here, the rear side) and easily discharged. The suction air may be applied to the battery holder H from two or more directions, and the number of air guiding directions to the merging chamber 174 is not limited to that of this example.

Fourth Embodiment

Figure 6:
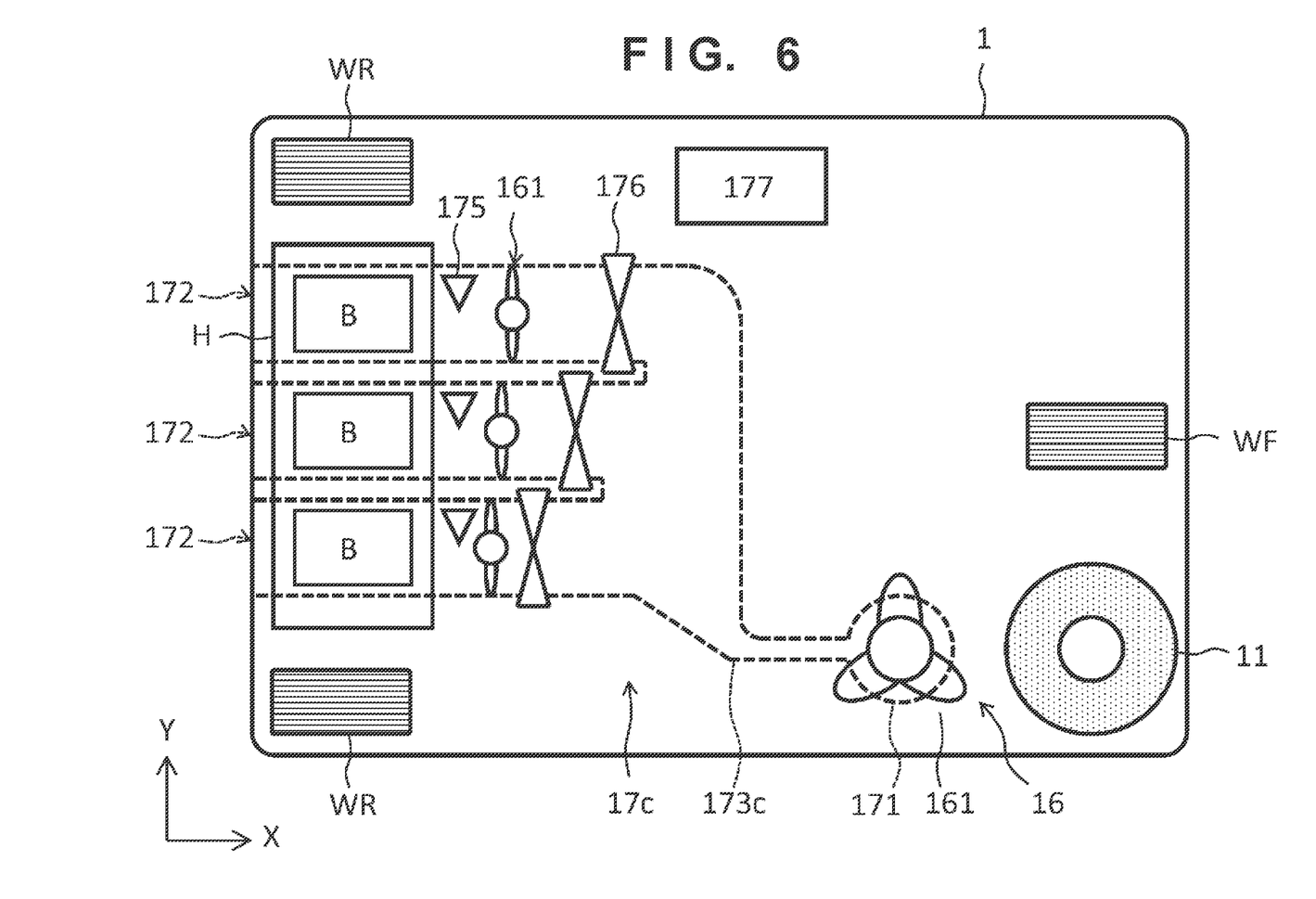
FIG. 6 is a schematic view illustrating another example of a configuration of an air guiding mechanism.

FIG. 6 illustrates a configuration example of an air guiding mechanism 17c according to a fourth embodiment. The battery holder H may be configured to be able to hold a plurality of battery units B. In that case, in consideration of the order in which they are used, variations in characteristics or quality thereof, and the like, the air guiding mechanism 17c may be configured such that the position to which the suction air should be applied to the battery holder H is variable.

In the present embodiment, the air guiding mechanism 17c may further include a plurality of sensors 175, a plurality of valves 176, and a controller 177. The plurality of sensors 175 is configured to be able to detect temperature, and can be provided corresponding to the plurality of battery units B. The plurality of valves 176 can be arranged corresponding to the plurality of branch paths in the air guide passage 173c.

The controller 177 individually controls the open and closed states of the plurality of valves 176 based on the detection results of the plurality of sensors 175. For example, in a case where the temperature detected by a certain sensor 175 satisfies the criterion, the valve 176 corresponding to the sensor 175 is opened, and the other valves 176 are closed. According to such a configuration, the position to which the suction air should be applied to the battery holder H becomes variable, and the plurality of battery units B can be individually cooled.

Alternatively/incidentally, the controller 177 may be able to individually control the opening degree of the plurality of valves 176. For example, the controller 177 may control the individual valves 176 so that the opening degree of the valve 176 corresponding to the position to which the suction air is to be applied is maximized and the opening degree of the valve 176 located away from the position is reduced.

In the present embodiment, the plurality of fans 162 can be arranged to correspond to the plurality of branch paths in the air guide passage 173c. At that time, the fan 162 corresponding to the valve 176 in the open state may be driven, and the driving of the fan 162 corresponding to the valve 176 in the open state may be suppressed.

In the above description, to facilitate understanding, each element is indicated by a name related to its functional aspect, but each element is not limited to an element that has the content described in the embodiment as a main function, and may be element that has supplementary content. Therefore, each element is not strictly limited to the expression, and such an expression can be replaced with a similar expression. For the same purpose, the expression "apparatus" may be replaced with "unit", "component", "piece", "member", "structure", "assembly", or the like, or may be omitted.

SUMMARY OF EMBODIMENTS

Some features of the above embodiments will be summarized as follows:

a first aspect provides a boarding sweeper (1), comprising:
- a cleaning working unit (11) capable of executing cleaning work;
- a seat portion (12) for seating a user;
- an operation input unit (13) that allows the user to input a driving operation;
- a suction unit (16) provided in a vicinity of the cleaning working unit;
- a battery holder (H) that detachably holds a battery unit (B); and
- an air guiding mechanism (17) that guides suction air from the suction unit so that the suction air passes through the battery holder.

As a result, the cleaning work can be appropriately performed using the power of the battery unit while appropriately cooling the battery unit. In addition, since the battery unit is replaceable, cleaning work can be continuously performed by operating the sweeper while replacing the battery unit, which is also advantageous for improvement of usability.

In a second aspect, the cleaning working unit includes a rotary brush (11) having a rotation axis in a vertical direction of a vehicle body.

Accordingly, the cleaning work can be appropriately realized.

In a third aspect,
the suction unit is provided behind the cleaning working unit.

As a result, the foreign matter generated by the cleaning work can be appropriately removed by negative pressure suction.

In a fourth aspect,
the suction unit includes a filter portion (162) for filtering particles in the suction air.

Accordingly, foreign matter generated by the cleaning work and sucked in the sweeper can be held in the sweeper.

In a fifth aspect,
the battery holder is arranged behind a lower portion of the seat portion.

Accordingly, the battery unit can be attached to or detached from the rear side of the vehicle body of the sweeper.

In a sixth aspect,
the air guiding mechanism (173) includes an air guide passage configured such that the suction air hits the battery holder from two or more directions.

As a result, the cooling efficiency of the battery unit held by the battery holder can be improved.

In a seventh aspect,
the air guiding mechanism includes an exhaust port (172) for discharging the suction air from a rear side of the vehicle body.

As a result, the suction air applied to the battery holder from two or more directions can be appropriately discharged from the rear of the vehicle body.

In an eighth aspect,
the sweeper further comprises:
a pair of left and right rear wheels (WR) and a single front wheel (WF), wherein
the cleaning working unit is disposed on one lateral side with respect to the front wheel, and
the air guide passage is configured to branch the suction air from the suction unit corresponding to the cleaning working unit on the one lateral side, and the branched suction air hits the battery holder.

Accordingly, the above sixth aspect is appropriately achievable.

In a ninth aspect,
the sweeper further comprises:
a pair of left and right rear wheels (WR) and a single front wheel (WF), wherein
the cleaning working unit is disposed on each of one lateral side and the other lateral side with respect to the front wheel, and
when the suction unit corresponding to the cleaning working unit on the one lateral side (11L) is defined as a first suction unit (16L) and the suction unit corresponding to the cleaning working unit on the other lateral side (11R) is defined as a second suction unit (16R),
the air guide passage is configured such that the suction air from the first suction unit and the suction air from the second suction unit hit the battery holder.

Accordingly, the above sixth aspect is appropriately achievable.

The invention is not limited to the foregoing embodiments, and various variations/changes are possible within the spirit of the invention.

What is claimed is:

1. A boarding sweeper comprising:
   a cleaning working unit configured to execute cleaning work;
   a seat portion configured to allow a user to sit thereon;
   an operation input unit configured to allow the user to input a driving operation;
   a suction unit provided in a vicinity of the cleaning working unit;
   a battery holder configured to hold a battery unit in a rear side of a body of the boarding sweeper, the battery unit being attachable and detachable in the rear side of the body; and
   an air guiding mechanism configured to guide suction air from the suction unit so that the suction air passes through the battery holder,
   wherein the air guiding mechanism is configured to change a position where the suction air is applied with respect to the battery holder.

2. The sweeper according to claim 1, wherein
the cleaning working unit includes a rotary brush having a rotation axis in a vertical direction of a vehicle body.

3. The sweeper according to claim 1, wherein
the suction unit is provided behind the cleaning working unit.

4. The sweeper according to claim 1, wherein
the suction unit includes a filter portion for filtering particles in the suction air.

5. The sweeper according to claim 1, wherein
the battery holder is arranged behind a lower portion of the seat portion.

6. The sweeper according to claim 1, wherein
the air guiding mechanism includes an air guide passage configured such that the suction air hits the battery holder from two or more directions.

7. The sweeper according to claim 6, wherein
the air guiding mechanism includes an exhaust port configured to discharge the suction air from a rear side of the vehicle body.

8. The sweeper according to claim 6, further comprising:
a pair of left and right rear wheels and a single front wheel, wherein
the cleaning working unit is disposed on one lateral side with respect to the front wheel, and the air guide passage is configured to branch the suction air from the suction unit provided in the vicinity of the cleaning working unit on the one lateral side, and the branched suction air hits the battery holder.

9. The sweeper according to claim 6, further comprising:
a pair of left and right rear wheels and a single front wheel, wherein
the cleaning working unit is disposed on each of one lateral side and the other lateral side with respect to the front wheel, and
when the suction unit provided in the vicinity of the cleaning working unit on the one lateral side is defined as a first suction unit, and the suction unit provided in the vicinity of the cleaning working unit on the other lateral side is defined as a second suction unit,
the air guide passage is configured such that the suction air from the first suction unit and the suction air from the second suction unit hit the battery holder.

10. The sweeper according to claim 1, wherein
the battery holder is provided with a notch (H1) so as to partially expose the battery unit.

11. The sweeper according to claim 10, wherein
the notch is a slit formed in an elongated shape along a direction in which the suction air passes.

12. The sweeper according to claim 11, wherein
the notch guides attachment or detachment of the battery unit.

* * * * *